United States Patent

Waitman et al.

[11] 3,754,931
[45] Aug. 28, 1973

[54] HIGH PROTEIN POTATO SNACKS

[75] Inventors: Reuben H. Waitman, Pearl River; Maria H. Kelly, Tarrytown, both of N.Y.; Frank Hollis, Jr., Hillsdale, N.J.

[73] Assignee: General Foods Corporation, White Plains, N.Y.

[22] Filed: Nov. 2, 1970

[21] Appl. No.: 86,312

[52] U.S. Cl. ................................ 99/100 P, 99/168
[51] Int. Cl. ........................... A23l 1/12, A23b 7/16
[58] Field of Search ........................ 99/1, 100, 168

[56] References Cited
UNITED STATES PATENTS

| | | | |
|---|---|---|---|
| R20,040 | 7/1936 | Romney | 99/100 P |
| 1,806,302 | 5/1931 | Magrill | 99/100 P |
| 2,589,591 | 3/1952 | Xander | 99/100 P |
| 2,779,678 | 1/1957 | Hamilton | 99/100 P |
| 3,052,545 | 9/1962 | Ducharme | 99/100 |
| 3,078,172 | 2/1963 | Libby | 99/100 |
| 3,092,500 | 6/1963 | Keil | 99/168 |
| 3,208,851 | 9/1965 | Antinoni | 99/100 |
| 3,402,049 | 9/1968 | Mancuso | 99/100 P |
| 3,499,132 | 6/1969 | Luksas | 99/168 |
| 2,910,370 | 10/1959 | Roger | 99/194 |
| 3,656,969 | 4/1972 | Horn | 99/100 |

*Primary Examiner*—Norman Yudkoff
*Assistant Examiner*—Martin G. Nullen
*Attorney*—Howard J. Newby, Bruno P. Struzzi and Daniel J. Donovan

[57] ABSTRACT

High protein containing potato snakes are prepared from raw potato slices with adhering coating of proteinaceous material and deep-fat fried. The protein bearing material is tightly adhered to the surfaces of the potato slices prior to and during deep-fat frying with proteinaceous binding material.

1 Claim, No Drawings

HIGH PROTEIN POTATO SNACKS

BACKGROUND OF THE INVENTION

1. Field of the Invention

This invention relates to snack-type food products and a method of preparing the same. In particular, the invention is directed to a method of preparing deep-fat fried snack products from potato slices having an adhering coating of flavorful proteinaceous food components.

2. Description of the Prior Art

Snack-type food products have, in recent years, attained wide consumer acceptance, and continue to become more in demand at an ever increasing rate. These products are usually enjoyed as supplements to regular meals in the forms of chips, puffs, crackers, etc. The great majority of snack products feature taste appeal, and, for the most part, have high nutritional factors of carbohydrate and fat. In general, the conventional snack products enjoying wide distribution are notably lacking in protein content.

Potato chips and other French-fried potato snack products, such as potato "sticks" and potato "strips" have a special appeal and enjoy wide-spread consumer acceptance especially among teenagers. These products, especially potato chips, are usually sold as a salted deep-fat fried product.

Variants, such as synthetically colored or flavored potato chips are also available to a much limited extent. Although efforts have been made in the past to fortify potato snack products with proteins, within present knowledge, none of these products has enjoyed commercial success.

Magrill, U.S. Pat. No. 1,806,302 and Romney U.S. Pat. Reissue No. 20,040 disclose the preparation of potato chips impregnated/coated with cheese, but this appears to be the extent of successfully augmenting potato snack products of this type with protein containing components. Although Magrill does, incidentally, mention that meat, milk, nut, or other food products may be applied to the surfaces of potato chips after they are oil cooked, he does not describe how the operation is to be successfully accomplished, but, in effect, poses the problem of how to adequately integrate the protein bearing food with the potato chip structure. An unfilled need exists for an attractive appearing French-fried potato chip snack item which is supplemented with a significant amount of flavorful protein components wherein the product, in addition to satisfying consumer taste appeal, also contributes appreciably toward satisfying the protein requirements of a healthful diet.

SUMMARY OF THE INVENTION

It is, therefore, an object of this invention to provide deep-fat fried snack-type products having a significant content of healthful protein.

It is another object of this invention to provide deep-fat fried snack-type products having excellent texture and flavor.

It is a further object of this invention to provide a deep-fat fried food snack product having, as a base, a low cost potato structure to which are added proteinaceous food materials having appealing deep-fat fried flavor.

It is still another object of this invention to provide a healthful snack product having a special appeal to teen-agers.

It is a feature of the instant invention that a variety of proteinaceous food materials may be utilized for augmenting the protein content of the products of the invention.

It is another feature of the invention that the products derived therefrom, while supplementing the diet with protein, unlike conventional deep-fat fried potato products, and especially unlike conventional potato chips, have the capability of readily satiating the appetite. In effect, the products of the invention supplement the diet with protein and also deter excess intake of fat and carbohydrate.

It is still another feature of the products of the invention that they are structurally stronger than conventional potato chips and, therefore, have greater capability to withstand handling during transportation and marketing. Also, the proteinaceous supplemented potato chips of the instant invention have an attractive velvety brown surface.

Briefly, the foregoing objects and others are realized by a unique method of adhering proteinaceous food particles to the surfaces of potato slices, strips and sticks and then deep-fat frying the combination to form an attractive appearing and flavorful product.

The products of the invention have the textural attributes of conventional deep-fat fried potato snacks plus the nutritional advantage of having a significant amount of protein.

The invention is founded on the discovery of the method to adhere the proteinaceous food material to the uncooked potato slice prior to deep-fat frying in such a manner that it is retained on the surface of the potato structure during deep-fat frying and is not removed by the steam escaping from the potato as it is being cooked.

Surprisingly, it has been found that adherence of the protein material serving as a coating can be successfully attained both before and during deep-fat frying by employing a heat coagulable protein as the adhesive medium. A dilute aqueous solution, or sol, of heat coagulable protein has been discovered to have the synergetic function of providing a thin, tacky coating to the uncooked potato slice for adequately adhering the proteinaceous coating and, in addition, supplying a portion of the protein supplement to the potato structure. When the uncooked potato slice is dipped, or otherwise coated, with the dilute aqueous solution of heat coagulable protein, a uniformly thin coating is effected which is adequate to adhere a uniformly thick layer of other dry proteinaceous material particles to the surface of the potato slice prior to the combination being deep-fat fried. Most importantly, during deep-fat frying, the thin coating of dilute aqueous solution of heat coagulable protein is capable of quickly coagulating under the temperature conditions of the deep-fat frying operation, and in so doing, further binds the protein material to the potato structure. As distinct from any non-heat coagulable binding agent, the heat coagulable protein coagulates before the water in the potato has an opportunity to escape as steam during the deep-fat frying operation and force the proteinaceous coating from the surface of the potato structure. Since the heat coagulable protein binding medium is in the form of a uniformly very thin layer, the steam which does emanate from the potato chip during frying is capable of penetrating the thin layer and escaping through the interstices of the uniform but discontinuous coating of proteinaceous material.

In effect, the heat coagulable protein binding medium is sufficiently tacky to adhere the proteinaceous material to the potato structure prior to deep-fat frying and, by coagulation, further binds the coating material during deep-fat frying, and still further, permits steam to escape from the potato without separating the coating from the potato structure. The net effect is a product with a crisp potato chip base or body upon which is coated a tightly adhering flavorable proteinaceous material, both potato base and coating material exhibiting a well-cooked deep-fat fried flavor.

Unlike batter coated potato chips wherein the thick impervious coating is separated from the chip body by the action of the escaping steam during deep-fat frying, the proteinaceous coating of this invention assures no separation and, in effect, produces a product wherein the coating may be considered integral with the potato base structure.

The aforementioned is by way of explanation of why the successful products result from the method of the invention. Understandably, the invention is not to be construed to be limited to the partial explanation of the mechanism by which the heat coagulable protein adheres the proteinaceous food supplement to the potato slice to form a coating integrated with the surface of the slice. Rather, the nub of the invention is the fact the uncooked protein-bearing coating can be tightly adhered to the potato structure prior to and during deep-fat frying by a material which also adds to the protein nutritional content of the products.

DESCRIPTION OF THE PREFERRED EMBODIMENTS

In the practice of this invention, a thin potato slice is the preferred structure to which the coating of proteinaceous material is applied prior to deep-fat frying. Potato slices of a thickness used for the manufacture of potato chips are ideally suited to the invention because the potato slice is fully cooked at about the same time as the coating of proteinaceous material when the deep-fat frying takes place in conventional batch and continuous equipment under frying conditions normally used for potato chip manufacture.

Although the invention can be broadened to other forms of potato slices such as sticks or strips, care must be exercised in the selection of the coating, its thickness, and the deep-fat frying conditions in order to avoid over-cooking the coating prior to sufficiently cooking the potato body. Similarly, it is contemplated that the scope of the invention can be extended to include base materials other than potatoes. Thus, variations of the invention would be to apply coatings other than proteinaceous bearing materials to base materials, such as carrots, turnips, etc. provided proper adjustments are made in the thickness of the coating and the geometry of the base materials to obtain a uniformly cooked product.

In addition to affording a product quite similar to the desirable crisp texture of potato chips, thin potato slices, as used by the method of this invention, are also preferred because of their large surface area per unit weight which is conducive to adhering a significant amount of proteinaceous material in a relatively thin, uniformly distributed coating to achieve a high protein containing potato snack product.

For purposes of the invention, it has been found that potato slices having a thickness ranging from about 0.030 inch to about 0.060 inch are most suitable. As with conventional potato chip manufacture, the raw potato slices are optionally subjected to a sulphite solution dip to inhibit surface darkening prior to deep-fat frying. This dip is especially effective if a delay is contemplated before the raw potato slices are to be deep-fat fried. The sulphited slices are then surface dried of excess water and immersed in an aqueous mixture of heat coagulable protein. A dilute aqueous solution of egg white has been found to be the preferred heat coagulable protein material for applying to the potato slices to effect excellent adherence of the majority of coatings employed in carrying out the invention. Fresh egg white or reconstituted dry egg white to which is added to the mix about 1 to about 9 parts of water has been determined to produce the most preferred binding medium. This degree of dilution of the egg white assures a uniformly thin, tacky coating when applied to the potato slice; a coating which, as explained above, is distinguishable from a thick, impermeable batter coating in that, when coagulated by the heat of the deep-fat frying operation, the coating permits the steam to escape from the potato as it is being cooked and yet tightly binds the proteinaceous food supplement to the potato surface. Also, the use of the above range of dilution of egg white limits the amount of egg white which is applied to the potato surface to the extent the egg white flavor is not a predominant factor in the overall taste of the finished product.

With the use of some proteinaceous coating materials, notably with fish, it has been discovered that the coating material inherently contains sufficient amounts of heat coagulable protein to satisfactorily adhere the supplemental protein coating to the potato slice without the use of egg white or any other binding material. It has been found that the heat coagulable protein, Myosin, occurs in fish in an amount adequate to satisfactorily adhere the fish protein supplement material to the potato slice.

The coatings of supplemental proteinaceous material which can be applied to the potato slice can be selected from many sources. To obtain the advantages of a significantly high protein content addition to the potato slice, it is, of course, necessary to add material having a high protein content. However, if the attribute of a significant amount of protein is not desired, non-proteinaceous material can, of course, be employed. The critical factor, with all types of coating, is the capability of being adhered to the potato slice with a heat coagulable protein medium and that this adherence should be satisfactorily effective both before and after the heat coagulable protein is coagulated.

Coatings of such materials as shredded fish, chicken, bacon, and ham have been successfully applied to potato slices by employing the method of the invention. In the case of fish, it has been found to be unnecessary to employ any binding medium.

The most desirable appearing and most effective adherence of the coating occurs when the coating is in a shredded form. Although flaked and powdered forms of coatings can be successfully applied, the shredded form provides the optimum overall result. While the actual sieve size of the coating shredded material is not critical, it is essential for good adherence to the potato slice and for appearance purposes that a shred size ranging from about 8 mesh to about 20 mesh be employed.

The coating is applied to the potato slice by any one of a number of conventional methods. The coating may be cascaded over the potato slices or the slices dredged in a body of the coating material. Preferably, a coating ranging from about 5 percent to about 40 percent by weight of the deep-fat fried product is applied to the potato slices. The amount of protein added to the potato slice will, of course, depend upon the protein content of the coating material. In general, however, the protein added to the potato slice will range in amounts from about 10 percent to about 25 percent.

As stated hereinabove, the coated potato slices can be deep-fat fried in conventional equipment of either the batch or continuous type, and using the standard operating procedures employed for the deep-fat frying of potato chips. With potato slices of a thickness of about 0.030 inch to about 0.060 inch coated with approximately 5 percent to about 40 percent proteinaceous material, deep-fat frying of about 60 to about 35 seconds at temperatures of 350°F. to 450°F. has been determined to yield excellent, flavorful well-cooked products.

In order to further illustrate the present invention, but in no way limit it, the following illustrative examples are provided:

EXAMPLE I

Peeled raw potatoes were sliced to chips having a thickness ranging from about 0.035 inch to about 0.045 inch. The chips were surfaced washed in cold water, drained and then dredged in shredded, dry, salted codfish.

The coated chips were then deep-fat fried in a commercial frying oil at 350°F. until substantially all of the water in the chips was removed, as evidenced by near cessation of bubbling in the fat. The cooked, fish-coated chips were removed from the fat, drained and cooled and then packaged.

The finished chips had a tightly adhering coating of codfish shreds which provided a desirable delicate fish flavoring. Analysis showed a protein content of approximately 20 percent on a product weight basis.

EXAMPLE II

Raw potato slices prepared as in example I were dipped in a 1:1, by weight, aqueous dilution of raw egg white and then allowed to drain. The egg white coated chips were then dredged in coarsely ground, well-fried bacon shreds.

The bacon coated chips were then deep-fat fried as in Example I resulting in chips having a unique, tightly adhering bacon shred coating which imparted a desirable bacon flavor to the product. Analysis showed the bacon coated chips to have a protein content of about 15 percent.

EXAMPLE III

As in example II except crumbled and ground well-fried ham was used in place of the bacon.

Although exemplary embodiments of the invention have been disclosed and discussed, it will be understood that other applications of the invention are possible and that other embodiments disclosed may be subjected to various changes, modifications and substitutions without necessarily departing from the spirit of the invention.

What is claimed and desired to be secured by Letters Patent is:

1. A completely deep-fat fried snack-type food consisting of:
   a. a fried potato slice having a thickness of from about 0.03 inch to about 0.06 inch,
   b. a moisture pervious fried coating of eggwhite, said eggwhite being coagulated, and encasing said fried potato, and
   c. a coating of fried shredded animal proteinaceous food material over said coating of eggwhite, said coating of fried shredded animal proteinaceous food material having a shred size ranging from about 8 mesh to about 20 mesh and tightly adhered to the potato slice by the coagulated eggwhite, and said coating of shredded animal proteinaceous food material comprising from about 5 percent to about 40 percent of the weight of the cooked food product.

* * * * *